United States Patent
Pinel et al.

(10) Patent No.: US 9,971,737 B2
(45) Date of Patent: *May 15, 2018

(54) IDENTIFYING SUBSTITUTE INGREDIENTS USING A NATURAL LANGUAGE PROCESSING SYSTEM

(71) Applicant: International Business Machines Corporation, Armonk, NY (US)

(72) Inventors: Florian Pinel, New York, NY (US); Edward E. Seabolt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/199,698

(22) Filed: Jun. 30, 2016

(65) Prior Publication Data

US 2017/0220558 A1 Aug. 3, 2017

Related U.S. Application Data

(63) Continuation of application No. 15/009,905, filed on Jan. 29, 2016, now Pat. No. 9,519,620.

(51) Int. Cl.
*G06F 17/20* (2006.01)
*G06F 17/28* (2006.01)
(Continued)

(52) U.S. Cl.
CPC ............ *G06F 17/20* (2013.01); *G06F 17/271* (2013.01); *G06F 17/2785* (2013.01);
(Continued)

(58) Field of Classification Search
CPC ...................................................... G10L 17/20
See application file for complete search history.

(56) References Cited

U.S. PATENT DOCUMENTS 6,370,513 B1 * 4/2002 Kolawa ................. G06Q 30/02
705/15
9,519,620 B1 * 12/2016 Pinel ....................... G06F 17/20
(Continued)

FOREIGN PATENT DOCUMENTS

WO 2007110788 A2 10/2007

OTHER PUBLICATIONS

Pinel et al., "Identifying Substitute Ingredients Using a Natural Language Processing System," U.S. Appl. No. 15/009,905, filed Jan. 29, 2016.
(Continued)

*Primary Examiner* — Douglas Godbold
(74) *Attorney, Agent, or Firm* — Nathan M. Rau

(57) ABSTRACT

A first food ingredient may be received. The first food ingredient may comprise a first plurality of chemical constituents. A plurality of candidate food ingredient substitutes may be received. Each candidate food ingredient substitute may comprise a second plurality of chemical constituents. For each of the plurality of candidate food ingredient substitutes, a quantity of the second plurality of chemical constituents that match the first plurality of chemical constituents may be determined. One or more food ingredient substitutes may be identified based on at least the quantity of the second plurality of chemical constituents that match the first plurality of chemical constituents.

13 Claims, 8 Drawing Sheets

(51) Int. Cl.
*G06N 99/00* (2010.01)
*G06F 17/27* (2006.01)
*G06F 17/30* (2006.01)

(52) U.S. Cl.
CPC ........ *G06F 17/28* (2013.01); *G06F 17/30616* (2013.01); *G06F 17/30716* (2013.01); *G06N 99/005* (2013.01)

(56) References Cited

U.S. PATENT DOCUMENTS

| | | | |
|---|---|---|---|
| 2011/0185342 A1* | 7/2011 | Argue | G06F 8/10 717/113 |
| 2015/0058065 A1* | 2/2015 | Pinel | G06Q 10/06313 705/7.25 |
| 2015/0199608 A1* | 7/2015 | Pinel | G06N 7/005 706/46 |
| 2015/0220592 A1* | 8/2015 | Robberechts | G06F 17/30386 715/810 |
| 2015/0242468 A1* | 8/2015 | Shoemaker | G06F 17/277 707/755 |
| 2016/0103839 A1* | 4/2016 | Altaf | G06Q 30/0282 707/723 |
| 2016/0179935 A1 | 6/2016 | Bhattacharjya et al. | |
| 2016/0203192 A1 | 7/2016 | Bhattacharjya et al. | |

OTHER PUBLICATIONS

List of IBM Patents or Patent Applications Treated as Related, signed Jun. 30, 2016, 2 pages.

\* cited by examiner

IDENTIFYING SUBSTITUTE INGREDIENTS USING A NATURAL LANGUAGE PROCESSING SYSTEM

BACKGROUND

The present disclosure relates to natural language processing systems, and more specifically to identifying one or more substitute ingredients for one or more particular recipes in a natural language processing (NLP) system.

Recent research has been directed to developing cognitive computing systems (e.g., concept expansion systems, question answering (QA) systems, etc.) that utilize NLP. Cognitive computing systems may build knowledge and learn (e.g., via training), understand natural language, reason, quickly identify new patterns, put content in context with confidence scores, analyze terms and interpret the terms' meanings, all of which may ultimately model intelligence. For example, QA systems may be designed to receive input questions, analyze them, and return applicable candidate answers. These systems may rely on NLP, automated reasoning, machine learning, and other advanced techniques. Using these techniques, QA systems may provide mechanisms for searching large sources of content and analyzing the content with regard to a given input question in order to determine an answer to the question. In some QA systems this may take the form of hypothesis generation, scoring, and ranking in order to determine a final set of one or more output answers.

SUMMARY

One or more embodiments are directed to a computer-implemented method, a system, and a computer program product for identifying substitutes for ingredients in a recipe based on analyzing chemical association. A first food ingredient may be received. The first food ingredient may comprise a first plurality of chemical constituents. A plurality of candidate food ingredient substitutes may be received. Each candidate food ingredient substitute may comprise a second plurality of chemical constituents. For each of the plurality of candidate food ingredient substitutes, a quantity of the second plurality of chemical constituents that match the first plurality of chemical constituents may be determined. One or more food ingredient substitutes may be identified based on at least the quantity of the second plurality of chemical constituents that match the first plurality of chemical constituents.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
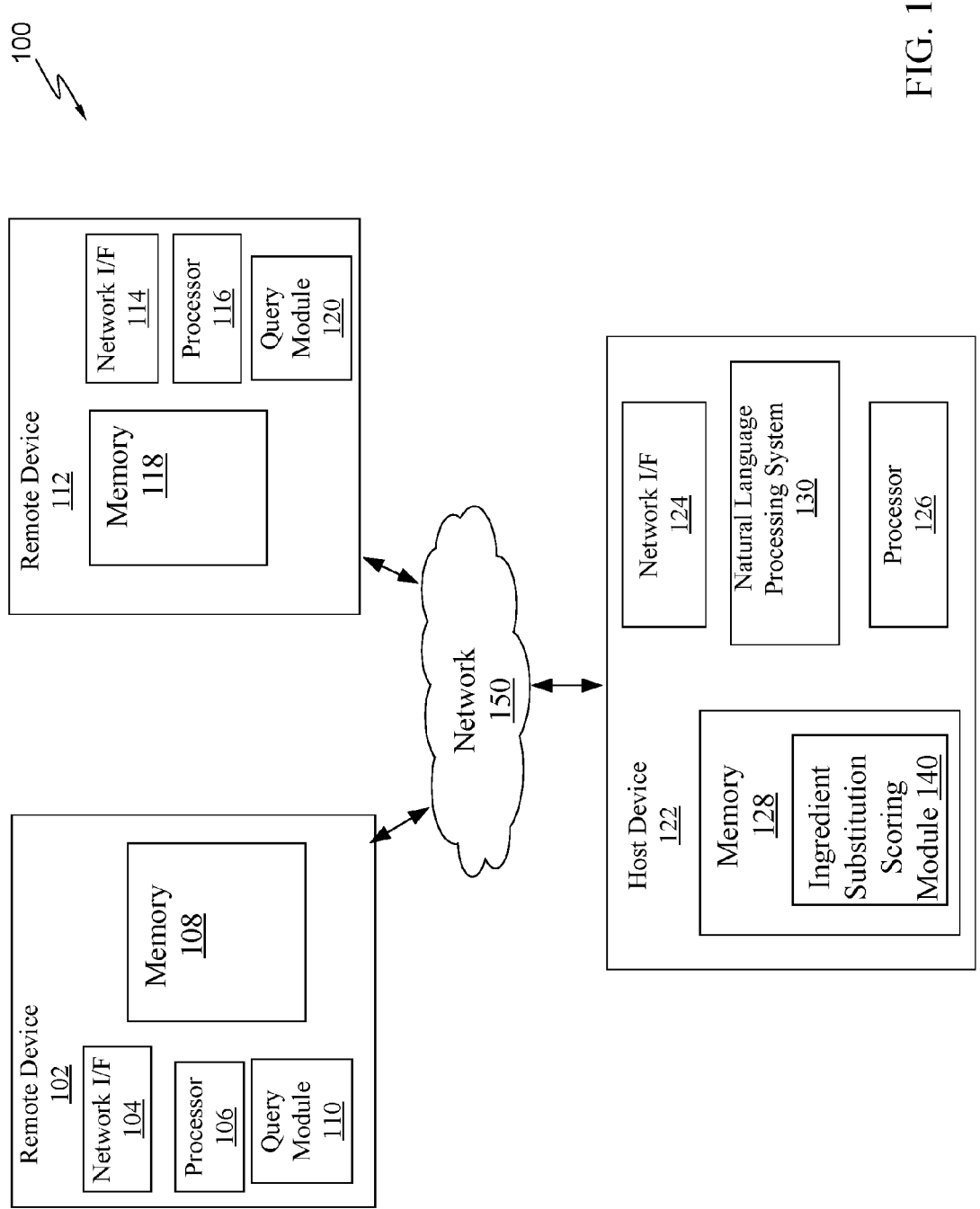
FIG. 1 is a block diagram of an example computing environment, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing systems, and more specifically to identifying one or more substitute ingredients for one or more particular recipes in a natural language processing (NLP) system. While the present disclosure is not necessarily limited to such applications, various aspects of the disclosure may be appreciated through a discussion of various examples using this context.

NLP-based systems (e.g., IBM Watson™ NLP systems) may employ more than one-hundred different algorithms to analyze natural language, identify sources, find and generate candidate results (e.g., candidate recipes), find and score data, etc. The original IBM Watson™ NLP system included a cluster of ninety IBM power 750 servers, each of which includes a 3.5 GHz POWER 7 eight core processor with four threads per core. In total, the original IBM Watson™ NLP system included 2, 880 POWER7 processor cores and 16 terabytes of random access memory (RAM). Some NLP systems may process around 500 gigabytes—the equivalent of a million books—per second. Sources of information in a NLP system information corpus may include recipe books, encyclopedias, dictionaries, thesauri, newspaper articles, literary works, scientific journals, social media posts, blogs, etc.

Some NLP systems may store thousands or more preexisting food recipes (e.g., old or original recipes) and generate novel food recipes based on deriving information from the preexisting recipes. For example, Chef Watson™ may be such NLP system that generates new recipes by understanding how ingredients are utilized in different dishes, what ingredients are commonly paired together and understanding various styles of cooking. NLP systems may also utilize knowledge of flavor compounds, food pairing theories, human taste preferences, etc. in order to generate new recipes. For example, particular ingredients may share particular flavor compounds, which makes the non-intuitive pairing of different foods possible and a source for an excellent tasting recipe. In an illustrative example, roast beef may share chemical compounds with beer, peanuts, and popcorn, which may enhance an eating experience when these items are eaten together. Accordingly, for example, a novel and great tasting recipe may be based on pairing beef with potatoes and a gravy that includes beer and/or peanuts.

A particular difficulty, however, may arise when one or more ingredients in a recipe is problematic for a particular user. For example, a user may be allergic to a particular ingredient, the user may not currently have the particular ingredient, or the user may desire to choose a healthy alternative ingredient without compromising the taste, smell, and/or texture. The user may therefore desire to provide one or more substitute ingredients for one or more particular existing ingredients in a recipe. However, it may be difficult to identify which substitute ingredients are the best candidates for substitution without comparing a food ingredient's chemical constituents with one or more candidate food ingredient substitutes' chemical constituents. As disclosed herein the term "chemical constituent(s)" may refer to the chemical composition that makes up a food ingredient/candidate food ingredient substitute such as one or more molecules, compounds, elements (atoms), moles, and/or other sub ingredient units (e.g., guar gum). If a user desires to substitute one ingredient for another without compromising taste, texture, aroma, etc., it follows that the user may desire to match as close as possible each chemical constituent of a candidate food ingredient substitute with each chemical constituent of an ingredient currently existing within a recipe (e.g., a novel generated recipe or preexisting recipe). Therefore, embodiments of the present disclosure are directed to identifying substitutes for ingredients in a recipe based on analyzing chemical composition association.

FIG. 1 is a block diagram of an example computing environment 100, consistent with embodiments of the present disclosure. In some embodiments, the computing environment 100 may include one or more remote devices 102, 112 (e.g., client computing devices) and one or more host devices 122 (e.g., natural language processing systems). Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In some embodiments, the network 150 can be implemented by any number of any suitable communications media (e.g., wide area network (WAN), local area network (LAN), Internet, intranet, etc.). Alternatively, remote devices 102, 112 and host devices 122 may be local to each other, and communicate via any appropriate local communication medium (e.g., local area network (LAN), hardwire, wireless link, intranet, etc.). In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 150.

In some embodiments, host device 122 may include a natural language processing (NLP) system 130, which is described in more detail below. As described herein a "natural language processing system" is one or more computing devices that performs NLP associated with natural language input (e.g., text associated with a user query) and/or NLP associated with data store content (e.g., text within an information corpus). NLP is the ability of a computing device(s) to process, understand, analyze, and/or generate human speech in one or more forms (e.g., speech recognition for auditory speech, understanding written speech via syntactic analysis, etc.). The host device 122 may further include a memory 128 that includes an ingredient substitution scoring module 140. The ingredient substitution scoring module 140 may be computer-readable program instructions that are stored within the memory 128 configured to identify, score, and rank one or more candidate food ingredient substitutes (e.g., those food ingredients that are candidates to replace a food ingredient) based on a chemical composition of the one or more of the food ingredients, as described in more detail below.

In some embodiments, remote devices 102, 112 may enable users to submit initial ingredients, recipes, filters (e.g., type of food desired, food themes, etc.) to host device 122 to retrieve one or more candidate recipes based on the user submission. For example, the remote devices 102, 112 may include a query module 110, 120 (e.g., in the form of a web browser or any other suitable software module) and present a graphical user interface (GUI) or other interface (e.g., command line prompts, menu screens, etc.) to solicit queries from users for submission to one or more host devices 122 and to display answers/results obtained from the host devices 122 in relation to such user queries. "Candidate recipes," as disclosed herein may be preexisting or new recipes that are returned to a user that may be ranked or scored in order to match the user input as close as possible. For example, if the user input ingredients of "fish" and "lemon," the user may receive a plurality of candidate recipes that contain the user's inputted ingredients of fish and lemon.

Consistent with various embodiments, host device 122 and remote devices 102, 112 may be computer systems, and may each be equipped with a display or monitor. The computer systems may include at least one processor 106, 116, 126; memories 108, 118, 128; internal or external network interface or communications devices 104, 114, 124 (e.g., modem, network cards, etc.); optional input devices (e.g., a keyboard, mouse, or other input device); and any commercially available or custom software (e.g., browser software, communications software, server software, NLP software, search engine and/or web crawling software, filter modules for filtering content based upon predefined criteria, etc.). In some embodiments, the computer systems may include servers, desktops, laptops, and hand-held devices (e.g., mobile phones, touch pads, smart watches, etc.).

Figure 2:
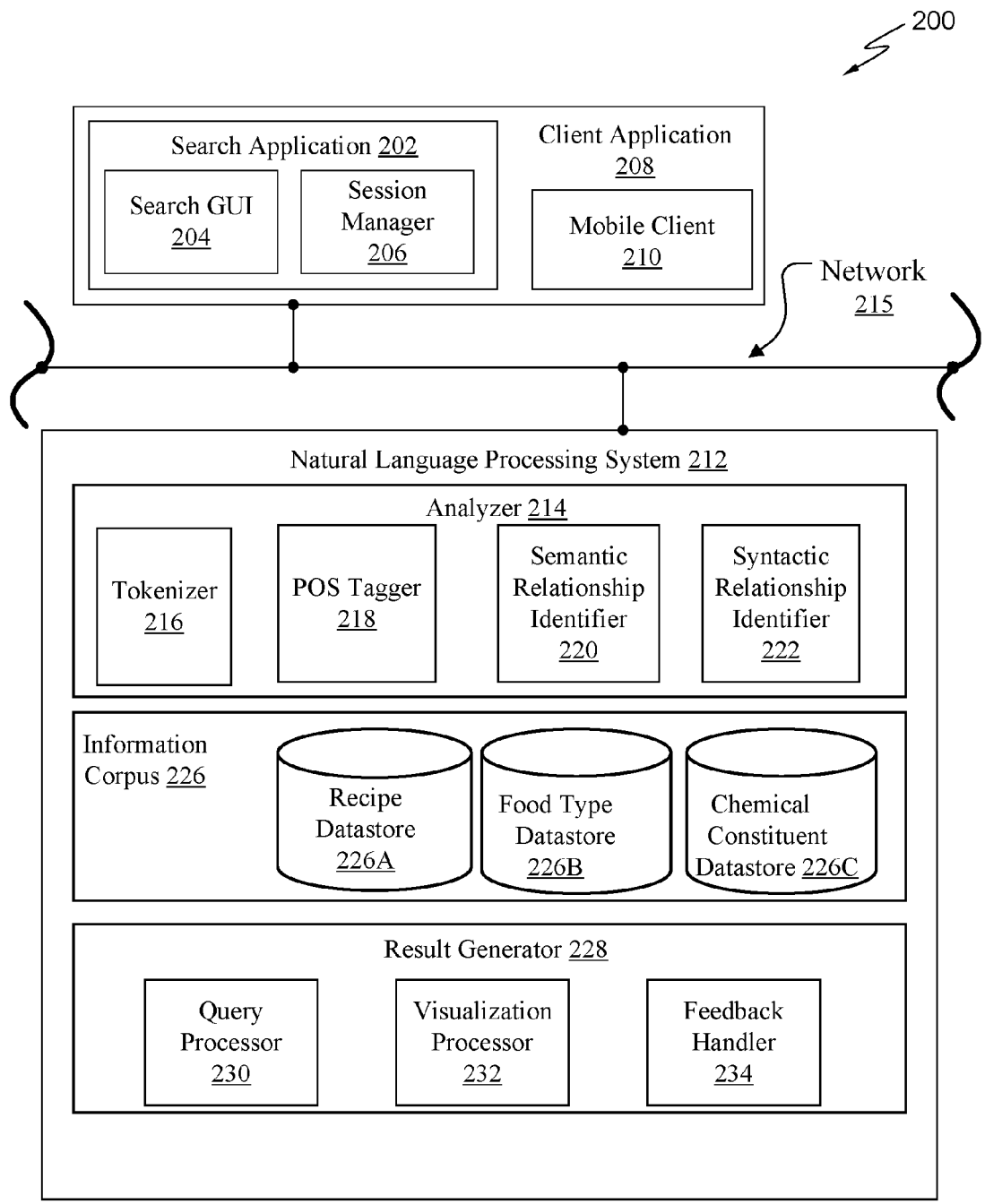
FIG. 2 is a block diagram of an example NLP system, according to embodiments.

FIG. 2 is a block diagram of an example NLP system 212 located within a computing environment 200, according to embodiments. The NLP system 212 may be configured for identifying one or more food ingredients substitutes in a recipe based on chemical association. In some embodiments, one or more users can send requests for information to the NLP system 212 using a remote device (such as remote devices 102, 112 of FIG. 1). Such a remote device may include a client application 208 which may itself involve one or more entities operable to generate information that is then dispatched to system 212 via network 215. NLP system 212 may be able to perform methods and techniques for responding to the requests sent by the client application 208. In some embodiments, the information received at NLP system 212 may correspond to input ingredients and/or recipes received from users, where the input may be expressed in a free form and in natural language.

A query or input (e.g., food ingredients) may be one or more words that form a search term or request for data, information, or knowledge. The input may be expressed in the form of one or more keywords. Input may include various selection criteria and search terms. An input may be composed of complex linguistic features in addition to keywords (e.g., acronyms). However, a keyword-based search for answers to the inputs may also be possible. In some embodiments, using restricted syntax for questions posed by users may be enabled. The use of restricted syntax may result in a variety of alternative expressions that assist users in better stating their needs.

Consistent with various embodiments, client application 208 may operate on a variety of devices. Such devices may include, but are not limited to, mobile and handheld devices (e.g., laptops, mobile phones, personal or enterprise digital assistants, and the like), personal computers, servers, or other computer systems that access the services and functionality provided by NLP system 212. In some embodiments, client application 208 may include one or more components, such as a mobile client 210. Mobile client 210, acting as an agent of client application 208, may dispatch user query requests to NLP system 212.

Consistent with various embodiments, client application 208 may also include a search application 202, either as part of mobile client 210 or separately, that may perform several functions, including some or all of the above functions of mobile client 210 listed above. For example, in some embodiments, search application 202 may dispatch requests for information, such as a particular recipe, to the NLP system 212. In some embodiments, search application 202 may be a client application to NLP system 212. Search application 202 may send requests for candidate results to NLP system 212. Search application 202 may be installed on a personal computer, a server, or other computer system.

In some embodiments, search application 202 may include a search GUI 204 and session manager 206. In such situations, users may be able to enter input or concept terms in search GUI 204. In some embodiments, search GUI 204 may be a search box or other GUI component, the content of which can represent input to be submitted to NLP system 212. Users may authenticate to NLP system 212 via session manager 206. In some embodiments, session manager 206 may keep track of user activity across sessions of interaction with the NLP system 212. Session manager 206 may also keep track of what inputs (e.g., ingredients) are submitted within the lifecycle of a session of a user. For example, session manager 206 may retain a succession of recipe restrictions posed by a user during a session (e.g., "find recipe with 'chicken' and 'broccoli,' but not 'cheese'"). In some embodiments, preexisting recipes, newly generated recipes, and/or candidate food ingredient substitutes are produced by NLP system 212 in response to a user input. Information for sessions managed by session manager 206 may be shared between computer systems and devices.

In some embodiments, client application 208 and NLP system 212 may be communicatively coupled through network 215, e.g., the Internet, intranet, or other public or private computer network. In some embodiments, NLP system 212 and client application 208 may communicate by using Hypertext Transfer Protocol (HTTP), Representational State Transfer (REST) calls, or any other suitable protocol. In some embodiments, NLP system 212 may reside on a server node. Client application 208 may establish server-client communication with NLP system 212 or vice versa. In some embodiments, the network 215 can be implemented within a cloud computing environment, or using one or more cloud computing services.

Consistent with various embodiments, NLP system 212 may respond to the requests for information sent by client applications 208 (e.g., a particular Italian dish recipe). NLP system 212 may then obtain a set of (i.e., one or more of) one or more preexisting recipes and generate its own set of one or more new recipes. In some embodiments, NLP system 212 may include an analyzer 214, an information corpus 226, and a result generator 228. The Analyzer 214 may be a computer module (e.g., Natural Language Processing (NLP) module) that analyzes the received input. Analyzer 214 may perform various methods and techniques for analyzing structured data (e.g., data from databases), unstructured data (e.g., data from a web page), and/or multimedia (e.g., images, audio, video, etc.). For example, the question analyzer 214 may utilize syntactic analysis and semantic analysis, as described below.

In some embodiments, analyzer 214 parses passages of documents, such as downloaded cookbook recipe pages. Analyzer 214 may include various modules to perform analyses of received inputs. For example, computer modules that analyzer 214 may incorporate include, but are not limited to, a tokenizer 216, a part-of-speech (POS) tagger 218, a semantic relationship identifier 220, and a syntactic relationship identifier 222.

In some embodiments, tokenizer 216 may be a computer module that performs lexical analysis. Tokenizer 216 may convert a sequence of characters into a sequence of tokens. A token may be a string of characters included in an electronic document (e.g., a recipe page) and categorized as a meaningful symbol. Further, in some embodiments, tokenizer 216 may identify word boundaries in an electronic document and break or parse any text passages within the document into their component text elements, such as words, multiword tokens, numbers, and punctuation marks. In some embodiments, tokenizer 216 may receive a string of characters, identify the lexemes in the string, and categorize them into tokens. In an example illustration, in order for the NLP system 212 to generate new recipes with one or more food ingredient substitutes, the tokenizer 216 may first parse a recipe page into component ingredients, or recipe steps, in order to compare different ingredients for substitution, as described more below.

Consistent with various embodiments, POS tagger 218 may be a computer module that marks up a word in passages to correspond to a particular part of speech. POS tagger 218 may read a passage or other text in natural language and assign a part of speech to each word or other token. POS tagger 218 may determine the part of speech to which a word (or other text element) corresponds based on the definition of the word and the context of the word. The context of a word may be based on its relationship with adjacent and related words in a phrase, sentence, question, or paragraph. In some embodiments, the context of a word may be dependent on one or more previously analyzed electronic documents (e.g., the content of one source document may shed light on the meaning of text elements in another source document). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, POS tagger 218 may tag or otherwise annotate tokens of a passage with part of speech categories. In some embodiments, POS tagger 218 may tag tokens or words of a passage to be parsed by the NLP system 212.

In some embodiments, semantic relationship identifier 220 may be a computer module that may identify semantic relationships and/or domains of recognized text elements (e.g., words, phrases) in documents. Words or phrases that share a same semantic class may share one or more attributes associated with a broader category. In some embodiments, semantic relationship identifier 220 may determine functional dependencies between entities and other semantic relationships. For example, if the NLP system 212 obtains a recipe with the ingredients of "steak," and "bell peppers," the semantic relationship identifier 220 may group steak into a "meat" food type class and bell peppers into a "vegetable" food type class. Grouping into particular classes may be useful for the NLP system 212 to utilize ontologies in order to find candidate food ingredient substitutes (or food ingredient substitutes). An "ontology" may be a particular conceptualization of a symbol (e.g., phrase, acronym, etc.) that represents something. An ontology may describe what a symbol represents as opposed to what a symbol means such that an entity may understand the definition by a well-described or understood symbol. Ontologies may include one or more axioms (i.e., a rule or statement that people generally regard as true) to better reflect a meaning of a symbol. The NLP system may utilize ontologies by mapping a particular set of ingredients (original ingredient to substitute ingredient) or an ingredient to a food type class. For example, if a user desired to have a recipe with the ingredient of "onions" to be substituted, the NLP system 212 may first search, via the semantic relationship identifier 220, the particular class to which "onions" belongs to (i.e., vegetables) and identify a food ingredient substitute for onions that is within the same class as "vegetables" by mapping onions to the substitute.

Consistent with various embodiments, syntactic relationship identifier 222 may be a computer module that may identify syntactic relationships in a passage composed of tokens. Syntactic relationship identifier 222 may determine the grammatical structure of sentences, for example, which groups of words are associated as phrases and which word is the subject or object of a verb. Syntactic relationship identifier 222 may conform to formal grammar. For example, within a recipe page, the syntactic relationship identifier 222 may determine the difference between cooking steps in a recipe and ingredients in the recipe.

In some embodiments, the analyzer 214 may be a computer module that can parse a received user query and generate a corresponding data structure of the user query. For example, in response to receiving an input at the NLP system 212, analyzer 214 may output a parsed recipe as a data structure. In some embodiments, the parsed input may be represented in the form of a parse tree or other graph structure. To generate the parsed input, the analyzer 214 may trigger computer modules 216, 218, 220, and 222. Additionally, in some embodiments, analyzer 214 may use external computer systems for dedicated tasks that are part of the parsing process. In some embodiments the analyzer 214 and/or the result generator 228 may be program modules located within the memory 128.

In some embodiments, the result generator 228 may be a computer module that generates new recipes or obtains preexisting recipes, which include recipes that include food ingredient substitute ingredients. Examples of recipes generated by result generator 228 may include, but are not limited to, responses in the form of natural language sentences; reports, charts, or other analytic representation; raw data; web pages; and the like.

In some embodiments, the output of the analyzer 214 may be used by search application 202 to perform a search of a set of corpora to retrieve one or more recipes in response to an input (e.g., ingredients). As used herein, a corpus may refer to one or more data sources. In an example illustration, if a user inputs a set of ingredients, along with filters of "Italian food," the search application 202 may then search within the corpora (e.g., information corpus 226) and locate within various uploaded recipe books each Italian food recipe (the preexisting recipe) with the input set of ingredients and generate a new recipe from this information. Accordingly, the NLP system 212 may return to the user both original and newly generated recipes based on the user input and filters.

In some embodiments, data sources may include data warehouses, information corpora (e.g., information corpus 226), data models, multimedia, and document repositories. In some embodiments, data sources may include an information corpus 226. The information corpus 226 may enable data storage and retrieval. In some embodiments, the information corpus 226 may be a storage mechanism that houses a standardized, consistent, clean and integrated form of potential target documents (e.g., recipe books, chemical compound structure information, chemical aroma/taste/texture information, etc.). In some embodiments, the information corpus 226 may include various datastores, such as the recipe datastore 226A, a food type datastore 226B, and a chemical constituent datastore 226C. The recipe datastore 226A may include various preexisting recipes and/or ingredient lists. "Preexisting" recipes as described herein may mean recipes that are already generally known by the public and/or are already downloaded to the natural language processing system 212 from existing recipe books or documents. "New" recipes on the other hand may be recipes that are not known by the natural language processing system 212 and/or general public to be in any cookbook or document. The food type datastore 226B may be a datastore that maps each ingredient (e.g., chicken) of the recipes to a food type class (e.g., meat) in order to find a proper substitute ingredient (and/or candidate) and newly generated recipe as described above.

The chemical constituent datastore 226C may, in some embodiments, be a datastore that maps each food ingredient (or candidate food ingredient substitute) to the ingredient's/candidate's chemical constituents or properties (e.g., chemical compounds, atomic elements, etc.) For example, the ingredient of "apple" may exist as a record within a database and a field within the record of apple may include the chemical compounds of apple-Syringaresinol, Alpha-Farnesene, Abscisic acid, Naringenin, 1-Butanol, 1-Heptanol, 1-Hexanol, 1-Methoxy-4(2-propenyl) benzene, and 1-Coumaroyl-beta-D-glucose. Accordingly, a candidate food ingredient substitute may be chosen to replace apples based on how many of these molecules are within the candidate food ingredient substitute, as described in more detail below.

In some embodiments, each chemical constituent (or food ingredient/substitute food ingredient) may be mapped to a particular class of flavors, aromas, and/or textures in order to identify suitable candidate food ingredient substitutes. In these embodiments subject matter experts (SMEs) (i.e., people with particularized knowledge) may be utilized to assign particular chemical constituents or properties to particular classes and store that information (e.g., aroma/texture/flavor descriptions) within the chemical constituent datastore 226 or other dedicated datastore. For example, with what is known as flavor chemistry knowledge, a SME may assign particular molecules to such classes as "salty," "sugary," "sour," "spicy," etc. based on his or her chemistry flavor knowledge. In an example illustration, if an original ingredient from a preexisting recipe was going to be substituted, the NLP system 212 may first determine the flavor class of the original ingredient, such as "salty." The NLP system 212 may then scan the "salty" ontology class to find other candidate food ingredient substitutes or chemical constituents that are assigned to the same "salty" class. Accordingly, the NLP system 212 may rank each candidate food ingredient substitute based on comparing one or more flavor descriptions of a food ingredient with one or more flavor descriptions of one or more ingredient substitute candidates and generate, in response to the ranking, a set of recipes.

In some embodiments, particular chemical constituents may be assigned to particular aroma classes. For example, butanal may be categorized as "green" smell class aroma description, selinene may be assigned to an "herb" smell class aroma description, methylisohexenyle ketone nonenone may be assigned to a "mushroom" smell class, butanal nonenone may be assigned to a "pungent" smell class, and methylisohexenyl ketone may be assigned to a "rubber" smell class. Each of these smell classes—green, herb, mushroom, pungent, and rubber—may correspond to an even larger food ingredient category such as "peppers." Accordingly, for an original ingredient (e.g., peppers), the NLP system 212 may rank one or more candidate food ingredient substitutes for substitution based on comparing aroma descriptions of the one or more substitute ingredients and the regular food ingredients and generate recipes based on the ranking. For example, the NLP system 212 may take an original ingredient, such as a pepper and scan a "pepper" smell class ontology to determine what other potential substitute ingredients and their associated chemical compositions are also within the "pepper" smell class in order to obtain an identical (or closely related) substitute food ingredient according to aroma.

In some embodiments, particular ingredients may be also assigned to texture classes and potential substitute ingredients may be chosen based on the texture of an original ingredient. For example, texture classes may be classes such as "smooth," "clumpy," "crunchy," "soft", etc. In an example illustration, for the ingredient of cottage cheese, the assigned class may be "clumpy." Accordingly, when trying to find a substitute ingredient for cottage cheese the NLP system 212 may scan the ontology class of "clumpy" in order to find a substitute ingredient that is also clumpy.

In some embodiments, each or some of the datastores—recipe datastore 226A, food type datastore 226B, and chemical constituent datastore 226C—may be combined into one datastore. In some embodiments, each of the datastores may correspond to different computing devices. For example, in a cloud computing environment, the NLP system may derive recipe ingredient information corresponding to the recipe datastore 226A from a first server, food type ontologies information corresponding to the food type datastore 226B from a second server, and chemical composition knowledge corresponding to the chemical constituent datastore 226C from a third server.

Consistent with various embodiments, result generator 228 may include query processor 230, visualization processor 232, and feedback handler 234. When information in the information corpus 226 or other data source that matches a parsed input is located, a technical query can be executed by query processor 230. Based on data retrieved by a technical query executed by query processor 230, visualization processor 232 may be able to render visualization of the retrieved data, where the visualization represents the newly generated recipes and preexisting recipes. In some embodiments, visualization processor 232 may render various analytics to represent the recipes and/or substitute ingredients including, but not limited to, images, charts, tables, dashboards, maps, and the like. In some embodiments, visualization processor 232 may present generated recipes that include food ingredient substitutes to the user.

In some embodiments, feedback handler 234 may be a computer module that processes feedback from users on recipes generated by the result generator 228. In some embodiments, users may be engaged in dialog with the NLP system 212 to evaluate the relevance of received recipes. Result generator 228 may produce a list of recipes in response to an input (e.g., ingredients) by a user. A user (e.g., SME) may rank and score each recipe (or substitute ingredient) according to its relevance to the input. In some embodiments, the feedback of users on generated answers may be used for future sessions.

Figure 3:
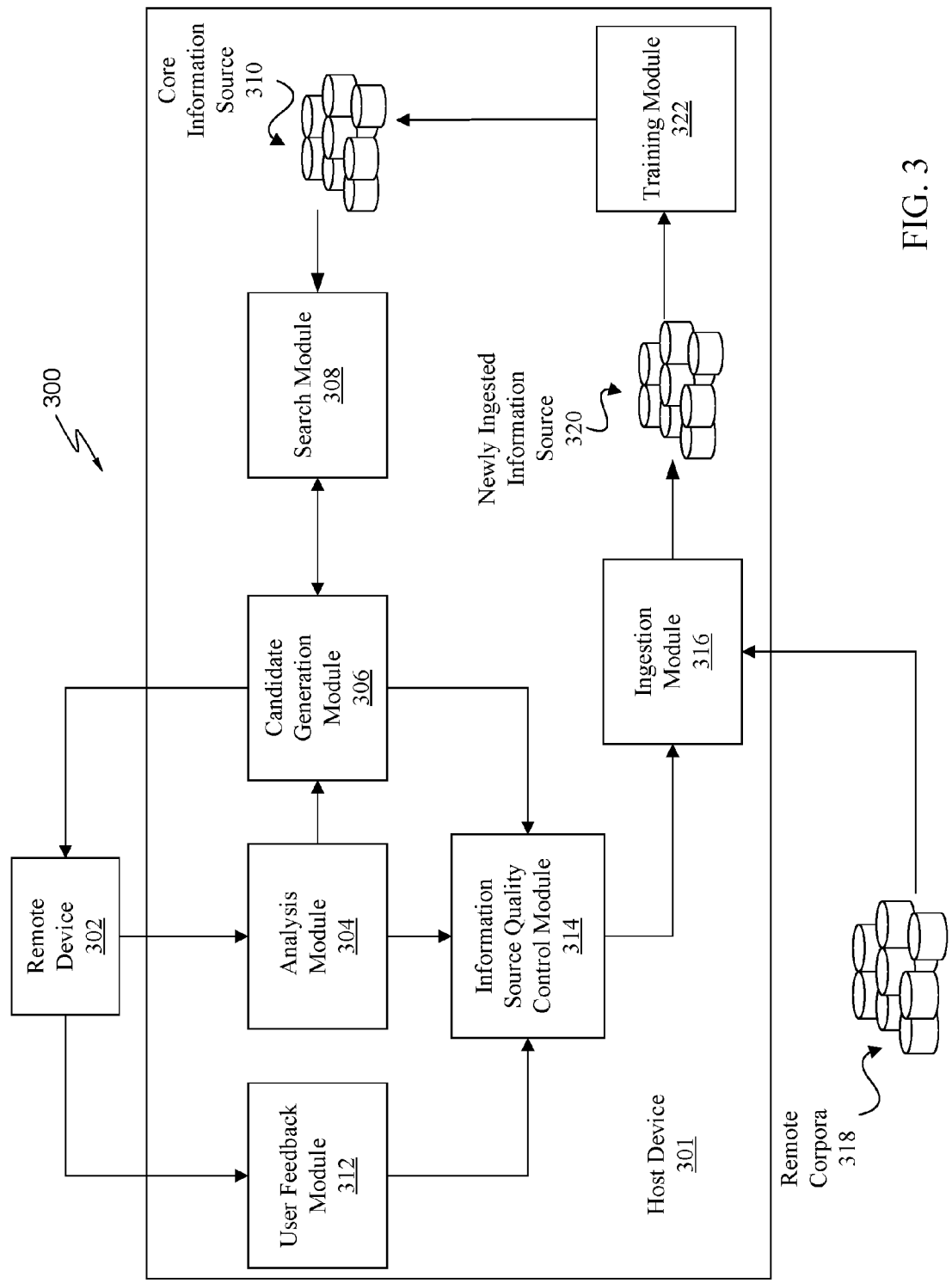
FIG. 3 is a block diagram of an example high level logical architecture of a NLP system, according to embodiments.

FIG. 3 illustrates a block diagram of an example high level logical architecture of a NLP system 300, according to embodiments. Aspects of FIG. 3 are directed toward components and modules for use with a cognitive computing system. In some embodiments, host device 301 and remote device 302 may be embodied by host device 122 and remote device 102 of FIG. 1, respectively. In some embodiments, the analysis module 304, located on host device 301, may receive a natural language input, such as a list of ingredients, from a remote device 302, and can analyze the input to produce information about the input (e.g., provide expanded list of preexisting and newly generated recipes). This may be accomplished, for example, by using components 216, 218, 220, 222, and 240 of FIG. 2. The information produced by analysis module 304 may include, for example, the semantic category of each ingredient input.

Next, the candidate generation module 306 may formulate queries (e.g., ingredient inputs) from the output of the analysis module 304 and then pass these queries on to search module 308 which may consult various resources (e.g., electronic recipe books, chemical compositions of recipes, etc.) to retrieve documents that are relevant for providing recipes that utilize substitute ingredients. As used herein, documents may refer to various types of written, printed, or electronic media (including passages, web-pages, database files, multimedia, etc.) that provide information or evidence. As illustrated in FIG. 3, the search module 308 may consult core information source 310. As used herein, a core information source may refer to any document or group of documents that is used by a NLP system to obtain preexisting recipes and generate new recipes from the list of preexisting recipes. The candidate generation module 306 may extract, from the search results obtained by search module 308, candidate recipes and/or ingredient substitute candidates, which it may then score (e.g., with confidence scores) and rank according to the chemical composition similarity of original ingredients, as described in more detail below. A final list of generated recipes, based on a comparison of various confidence scores associated with the generated recipes, may then be sent from the candidate generation module 306 to remote device 302 for presentation to the user. In addition, this information about generated recipes and confidence scores may also be sent to information source quality control module 314. A user (e.g., a SME) may respond, via remote device 302, to generate or alter provided recipes (e.g., input a query that specifies that a particular food ingredient or chemical constituent(s) should not be included in the results for substitute ingredients) through user feedback module 312. The user feedback module 312 may then provide this feedback to the information source quality control module 314.

In some embodiments, the information source quality control module 314 may compile and analyze information that it receives during the course of normal operations of the NLP system 300. This received information (e.g., information from analysis module 304, candidate generation module 306, and user feedback module 312) may be usable by the information source quality control module 314 to determine whether one or more new information sources should be ingested. When the information source quality control module 314 determines that a new information source having certain characteristics is needed (e.g., a new recipe is uploaded), it may instruct an ingestion module 316 accordingly. Based on these instructions, ingestion module 316 may search one or more remote sources, such as remote corpora 318, in an attempt to locate one or more suitable new information sources. In some embodiments, once discovered, these new information sources may be ingested by ingestion module 316 and become newly ingested information source 320. This information source may in turn be analyzed by training module 322. This training analysis may take the form of obtaining training candidate recipes from user inputs using the newly ingested information source 320 and then reviewing the quality of generated candidate recipes. As used herein, training candidate recipes may be used by a NLP system for either (1) reviewing or determining the quality or characteristics of an information source used to identify training candidate recipes, (2) creating or refining machine learning models and routing paths usable by the NLP system, or both. In some embodiments, once a threshold level of confidence in the new information source is met, it may be combined with core information source 310 and used to generate recipes based on input from users.

The various components and modules of the exemplary high level logical architecture for a NLP system described above may be used to implement various aspects of the present disclosure. For example, the analysis module 304 may, in some embodiments, be used to receive a set of inputs from a user, such as a list of ingredients. The candidate generation module 306 and search module 308 may together, in some embodiments, be used to perform searches of core information source 310, generate new recipes, identify candidate food ingredient substitute(s), calculate confidence scores associated with the new recipes (e.g., score ingredient substitute candidates, as described below), and provide the generated recipes to one or more users. Further, the information source quality control module 314 may, in some embodiments, be used to analyze confidence scores and determine whether the confidence scores fail to meet one or more confidence criteria. Further, ingestion module 316 may, in some embodiments, be used to ingest new information sources (in response to an indication from the information source quality control module 314 that a confidence criteria has not been satisfied).

Figure 4:
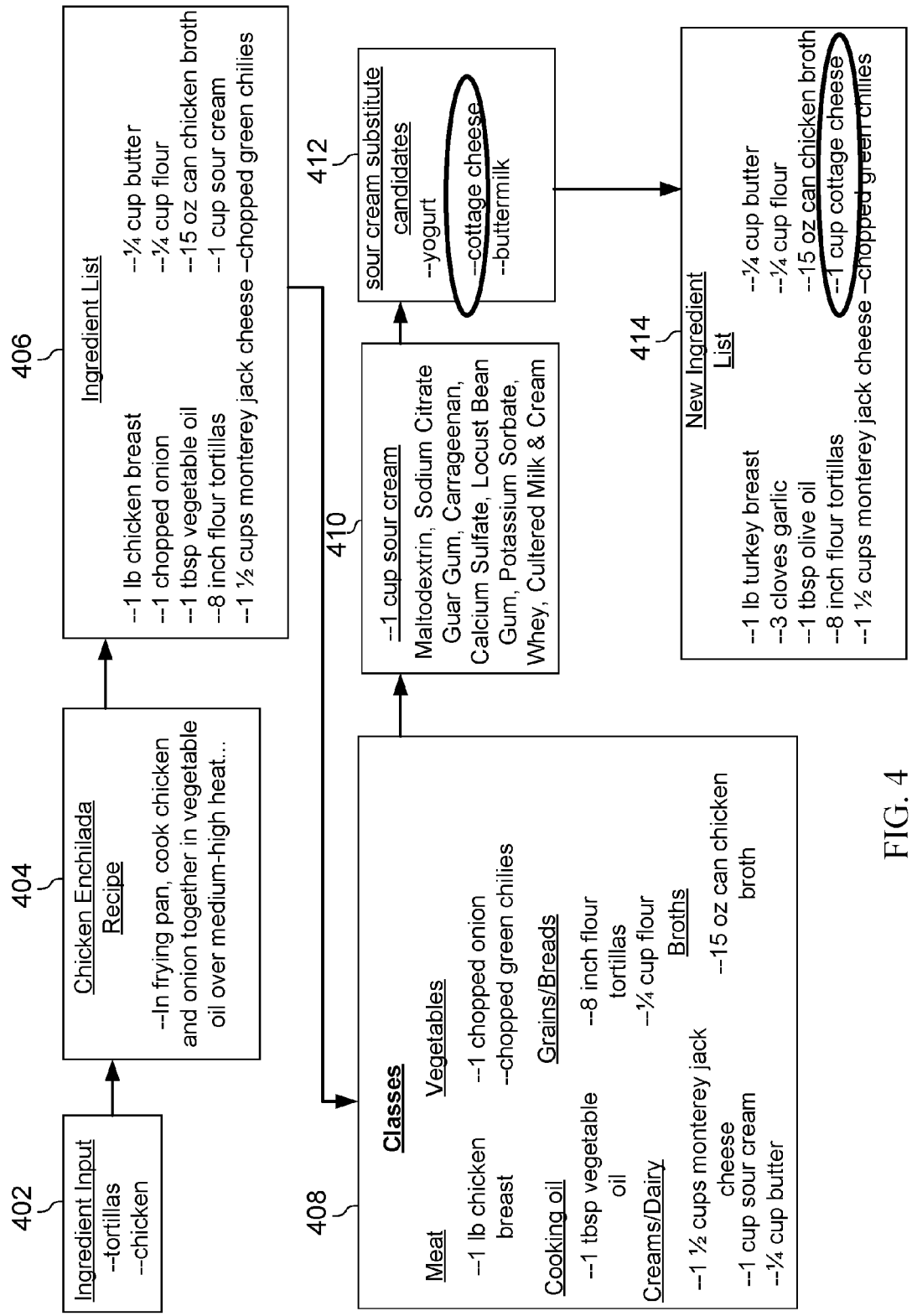
FIG. 4 is a diagram of an example process for generating a new recipe based on locating various suitable food ingredient substitutes, according to embodiments.

FIG. 4 is a diagram illustrative of a process for generating a new recipe based on locating various suitable food ingredient substitutes, according to embodiments. According to FIG. 4, a user may first input a set of ingredients 402—tortillas and chicken (e.g., via the query module 110 of FIG. 1). In some embodiments, the user input 202 may include entire recipes or other filters in addition or instead of tortillas and chicken (e.g., Mexican food, enchiladas only, no sour cream, etc.). In some embodiments, the user input 202 may correspond to the food ingredients that the user want substituted.

The NLP system may then generate or locate a chicken enchilada recipe 404. The chicken enchilada recipe 404, in some embodiments, may be a preexisting recipe already uploaded to the NLP system (e.g., information corpus 226 of FIG. 2) or a newly generated recipe. In some embodiments, the chicken enchilada recipe 404 may be parsed (e.g., via the tokenizer 216 of FIG. 2) in order to obtain the ingredient list 406 of the chicken enchilada recipe 404. In some embodiments, the chicken enchilada recipe 404 may already include the ingredient list 406 and therefore may not require parsing to obtain ingredients. In some embodiments, the chicken enchilada recipe 404 (or any recipe) may include both the ingredients needed to make a dish and the steps required for preparing and cooking the dish. As illustrated, the ingredient list 406 may include: 1 pound chicken breast, 1 chopped onion, 1 tablespoon of vegetable oil, 8 inch flour tortillas, 1½ cups of Monterey jack cheese, ¼ cup of butter, ¼ cup of flour, a 15 ounce can of chicken broth, 1 cup of sour cream, and chopped green chilies.

In some embodiments, after the NLP system obtains a list of food ingredients (ingredient list 406), the NLP system may group or assign each of the ingredients into various food type classes 408 (e.g., via the semantic relationship identifier 220 of FIG. 2). For example, as illustrated, the 1 pound chicken breast may be grouped or mapped to the "meat" class, the 1 chopped onion and the chopped green chilies may be assigned to the "vegetables" class, the 1 tablespoon of vegetable oil may be assigned to a "cooking oil" class, the 8 inch flour tortillas and the ¼ cup of flour may be grouped to a "grains/bread" class, the 1½ cups of Monterey jack cheese, 1 cup of sour cream, and ¼ cup of butter may be assigned to the "creams/dairy" class, and the 15 ounce can of chicken broth may be assigned to the "broths" class.

In some embodiments, after each ingredient has been assigned to a class, the NLP system may identify the chemical constituents for one or more of the ingredients on the ingredient list 406. The identifying the chemical constituents may be in response to a user query that specifies that a particular ingredient needs to be substituted (e.g., because the user does not have the ingredient). In some embodiments, the NLP system may identify the chemical constituents for each of the food ingredients on the ingredient list 406 for future user sessions that may require substituting any of the ingredients on the ingredient list 406. In an example illustration, if it was desired to locate a food ingredient substitute for the 1 cup of sour cream, the NLP may identify the chemical constituents of sour cream 410 (e.g., via the chemical constituent datastore 226C of FIG. 2). The chemical constituents of sour cream may include maltodextrin, sodium citrate, guar gum, carrageenan, calcium sulfate, locust bean gum potassium sorbate, whey, cultured milk, and cultured cream. In some embodiments, in order to find a suitable food ingredient substitute ingredient for sour cream, the NLP system may locate the same class as sour cream (i.e., creams/dairy) and locate another ingredient that matches as close as possible to the sour cream chemical constituents. For example, the NLP system may identify a list of sour cream candidate food ingredient substitutes 412 that are all under the class of "creams/dairy." The candidate food ingredient substitutes may include yogurt, cottage cheese, and buttermilk. In some embodiments, each substitute food ingredient candidate is chosen to be candidates for substitution based on meeting a threshold score or ranking (e.g., the substitute candidates share a threshold quantity of chemical compounds with sour cream). The NLP system may then score or rank each of the sour cream substitute candidates (e.g., via the ingredient substitution scoring module 140 of FIG. 1), which is described in more detail below. As illustrated in the sour cream substitute candidate list 412, cottage cheese may be selected as the highest-ranked food ingredient substitute candidate and may therefore be included in the candidate recipe, which may include the new ingredient list 414. The new ingredient list 414 may have replaced various ingredients found in the ingredient list 406. For example, 1 pound chicken breast may be substituted with 1 pound turkey breast, 1 chopped onion may be substituted with 3 cloves of garlic, 1 tablespoon of vegetable oil may be substituted with 1 tablespoon of olive oil, and as illustrated, 1 cup of sour cream may be substituted with 1 cup of cottage cheese. In some embodiments, the NLP system may generate other ingredient lists (corresponding to other recipes) instead of or in addition to the new ingredient list 414 as multiple candidate recipes. Accordingly, a user may view each of the multiple candidate recipes and choose which recipe he or she will ultimately utilize for preparing and cooking a meal.

Figure 5:
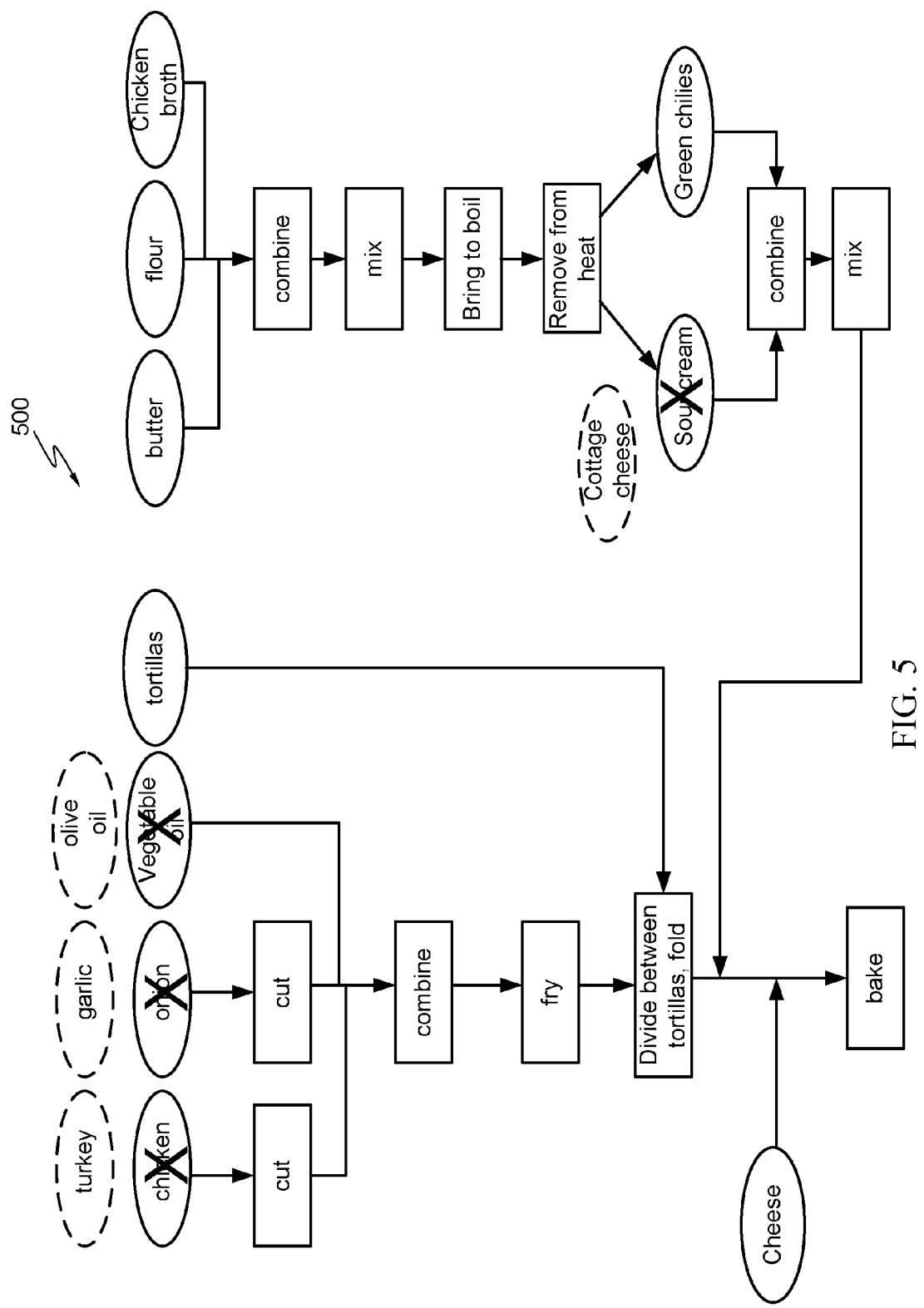
FIG. 5 is an example instruction graph illustrating substituted food ingredients for a candidate recipe, according to embodiments.

FIG. 5 is an example instruction graph 500 illustrating substituted food ingredients for a candidate recipe, according to embodiments. The instruction graph 500 may correspond to the new ingredient list 414 of FIG. 4. The instruction graph 500, however, may not just include the new substituted ingredients like the new ingredient list 414 illustrates, but the steps to prepare and cook the chicken enchilada dish. FIG. 5 illustrates that the preexisting recipe specified that the chicken and onion are cut and the vegetable oil is combined with the chicken and onion. The chicken, onion, and vegetable oil are then fried. The chicken and onion are then divided between a particular quantity of tortillas. The tortillas may then be folded. The instruction graph 500 also illustrates that butter, flour, and chicken broth may be combined and mixed. The butter, flour, and chicken broth may then be put into a pan and brought to a boil. The pan may then be removed from the heat. Sour cream and green chilies may then be combined and mixed with the mixed butter flour and chicken broth. The mixture of butter, flour, chicken broth, sour cream, and chilies may then be added (e.g., poured) on the tortillas that are already folded with chicken, onion, and vegetable oil inside the tortillas. Cheese may then be sprinkled on the top of the tortillas and the dish may then be baked.

FIG. 5 illustrates that the food ingredients of chicken, onion, vegetable oil, and sour cream have all been replaced with substitute food ingredients. Chicken has been replaced with turkey, onion has been replaced with garlic, vegetable oil has been replaced with olive oil, and sour cream has been replaced with cottage cheese. According to embodiments of the present disclosure, each of the substitute food ingredients may replace the older ingredients based on the how close candidate food ingredient substitutes closely match the chemical constituents of the older ingredients, as described in more detail below. In some embodiments, the preparation or cooking instructions may also be changed based on the ingredients utilized for substitute in a newly generated recipe. For example, because cottage cheese is a substitute food ingredient for sour cream and because cottage cheese has more of a clumpy texture than sour cream, an additional preparation step may be added such as "heat" and/or "blend" the cottage cheese before combining it with the green chilies in order to make the cottage cheese have more of a smooth texture analogous to sour cream.

Figure 6:
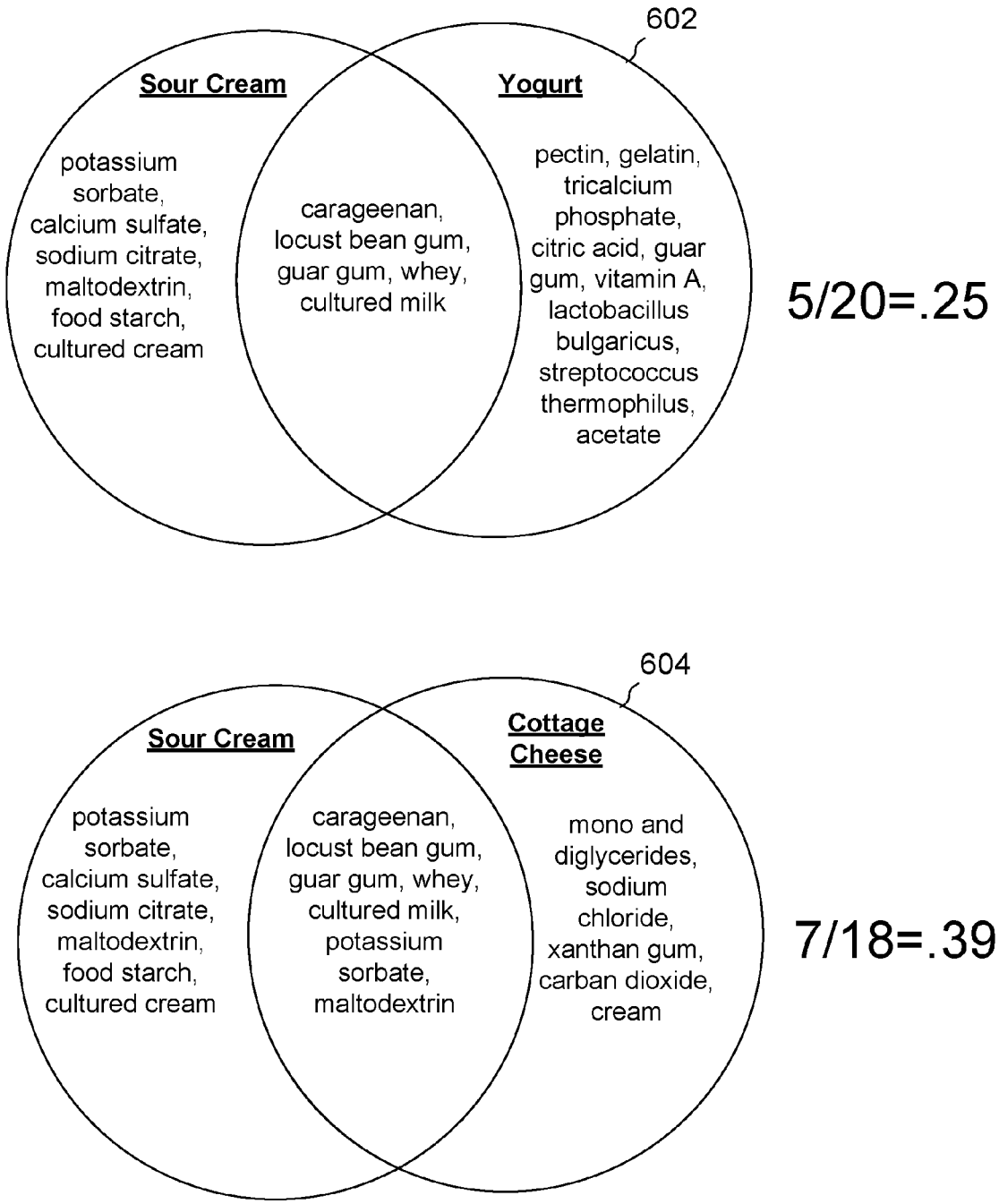
FIG. 6 is an example diagram illustrating a comparison of a current ingredient and two food ingredient substitutes in order to score and rank the food ingredient substitutes for substitution, according to embodiments.

FIG. 6 is an example diagram illustrating a comparison of a current food ingredient and two candidate food ingredient substitutes in order to score and rank the candidate food ingredients for substitution, according to embodiments. FIG. 6 illustrates a first venn diagram 602 and a second venn diagram 604 and associated scores for ingredient substitutability. The venn diagrams illustrate a set of chemical compositional constituents that are shared/match or not shared/match between ingredients. FIG. 6 may correspond to two of the substitute ingredient candidates as illustrated within the sour cream substitute list 412 of FIG. 4. Accordingly, the current or old ingredient that needs to be substituted may be sour cream and the substitute ingredient candidates may be cottage cheese and yogurt. FIG. 6 also illustrates that a substitute food ingredient candidate may be chosen as a food ingredient substitute based on the chemical compositional makeup or structural similarity to the current ingredient.

The venn diagram 602 illustrates that sour cream does not include the same or share the following chemical constituents with yogurt: potassium sorbate, calcium sulfate, sodium citrate, maltodextrin, food starch, and cultured cream. Likewise, the venn diagram 602 also illustrates that yogurt does not share the following chemical constituents with sour cream: pectin, gelatin, tricalcium phosphate, citric acid, guar gum, vitamin A, *lactobacillus bulgaricus, streptococcus thermophilus*, and acetate. The venn diagram 602 further illustrates that both sour cream and yogurt share the same following chemical constituents: carrageenan, locust bean gum, guar gum, whey, and cultured milk. Accordingly, yogurt has five matching/intersecting chemical constituents with sour cream.

In some embodiments, as illustrated in FIG. 6, the NLP system may score each of the candidate food ingredient substitutes (e.g., via the ingredient substitution scoring module 140 of FIG. 1) in order to rank the candidates for substitution. For example, the NLP system may utilize a Jaccard index. The Jaccard index is a statistic that ultimately compares the similarity and differences of sample sets. The Jaccard index may be specifically utilized to measure overlap of two sets A and B (e.g., overlap or "shared" molecules between sour cream and yogurt). The Jaccard index is represented by the following formula: $(A,B) = |A \cap B|/|A \cup B|$. Therefore, the quantity of items (e.g., chemical constituents) that intersect or are shared between A and B are divided by the quantity of items in the union of A and B (e.g., the quantity of unique chemical molecules that makeup yogurt and sour cream). If there is a 100% overlap in the quantity of intersecting/matched items, then the Jaccard index is 1 and if there is a 0% overlap in the quantity of intersecting/matched items, then the Jaccard index is 0. Accordingly, the closer a value approaches 1, the more overlap an item shares with another item.

According to the venn diagram 602, the associated Jaccard index is 0.25 (5 divided by 20). There are 5 chemical constituents that both sour cream and yogurt share (the intersecting/matched items)—carrageenan, locust bean gum, guar gum, whey, and cultured milk. And there are 20 total unique chemical composition structures between sour cream and yogurt. Therefore, dividing 5 by 20 results in a Jaccard index of 0.25.

According to the venn diagram 604, the associated Jaccard index is 0.39 (7 divided by 18). There are 7 chemical constituents that both sour cream and cottage cheese share—carrageenan, locust bean gum, guar gum, whey, cultured milk, potassium sorbate, and maltodextrin. And there are 18 total unique chemical constituents between sour cream and cottage cheese. Therefore, dividing 7 by 18 results in the Jaccard index of 0.39. The NLP system may then rank cottage cheese and yogurt as potential food ingredient substitutes based on the Jaccard index score. Because cottage cheese is scored closer to 1 than sour cream, cottage cheese may have more intersecting/matched chemical constituents than yogurt and therefore be ranked higher (i.e., have more priority) when generating candidate recipes using substitute food ingredients. Accordingly, cottage cheese may be more likely to be a food ingredient substitute for sour cream than yogurt.

In some embodiments, additional or different scoring mechanisms other than the Jaccard index may be utilized to determine whether a food ingredient should be substituted for another food ingredient. For example, a simple matching coefficient, the Sorensen Similarity index, a Mountford's index of similarity, etc. may be utilized.

In some embodiments, as illustrated in FIG. 6, both chemical molecules (e.g., potassium sorbate) and sub ingredients (e.g., guar gum) may be included in analyzing the chemical constituents of an ingredient/candidate (e.g., yogurt) for scoring. In some embodiments, only particular chemical constituent classes (e.g., molecules) may be analyzed to select a substitute ingredient candidate. In some embodiments, each element of a chemical molecule is analyzed for scoring in addition to or instead of analyzing molecules and/or sub ingredients.

In various embodiments, scoring for substitution may be dynamic such that each chemical constituent may be weighted when calculating a final score for substitution. Weighting may occur, for example, because a particular chemical compound, element, and/or sub ingredient may be mostly responsible for the taste, aroma, and/or texture of the ingredient while another ingredient may not be as significant (e.g., a molecule utilized to preserve a food ingredient, such as nitrates). In an example illustration, for the taste of sour cream, cultured cream and milk may be primarily responsible for the taste of sour cream as opposed to guar gum. Accordingly, cultured cream and milk may be weighted higher or carry more significance than guar gum when determining a substitute food ingredient. For example, using a Jaccard index, cultured milk may be counted as 2 shared ingredients instead of 1 such that the overall score will increase.

In some embodiments, dynamic scoring may take into account not just weighted chemical constituent factors, but other factors. For example, a food ingredient such as sour cream may be assigned to a particular aroma class (e.g., sour cream smell), flavor/taste class (e.g., sour cream taste), or texture class. Accordingly, candidate food ingredient substitutes may be scored in addition to, or instead of the manner illustrated in FIG. 6, by determining whether particular substitute ingredients fall within the same aroma, taste, and/or texture classes as a source food ingredient (e.g., sour cream).

In some embodiments, dynamic scoring may be take into account (instead of or in addition to the scoring methods described above) a quantity or presence of a particular chemical constituents (e.g., moles of a particular molecules) within an old/source food ingredient when compared to the same particular chemical constituent within one or more substitute ingredient candidates. In these embodiments, the same chemical structure of a chemical property within a food ingredient and candidate food ingredient substitute may be counted and compared and scored accordingly. For example, the NLP system may determine (e.g., via the chemical constituent datastore 226C) that a dollop of sour cream contains a quantity of 200 potassium sorbate molecules, whereas cottage cheese may contain 100 potassium sorbate molecules, and another second substitute ingredient candidate may contain only 80 potassium sorbate molecule. Accordingly, after comparing the quantities, cottage cheese may be scored higher than the second substitute ingredient candidate because cottage cheese may more closely match the quantity of potassium sorbate molecules contained in sour cream than the second substitute ingredient does. Therefore, cottage cheese may be ranked higher to be a substitute ingredient for sour cream. In some embodiments, dynamic scoring may take into account (instead of or in addition to the scoring methods described above) comparing chemical constituents of a particular ingredient both before and after cooking the ingredient and then comparing the particular ingredient to other ingredients before and after cooking chemical structures, which is described in more detail below.

Figure 7:
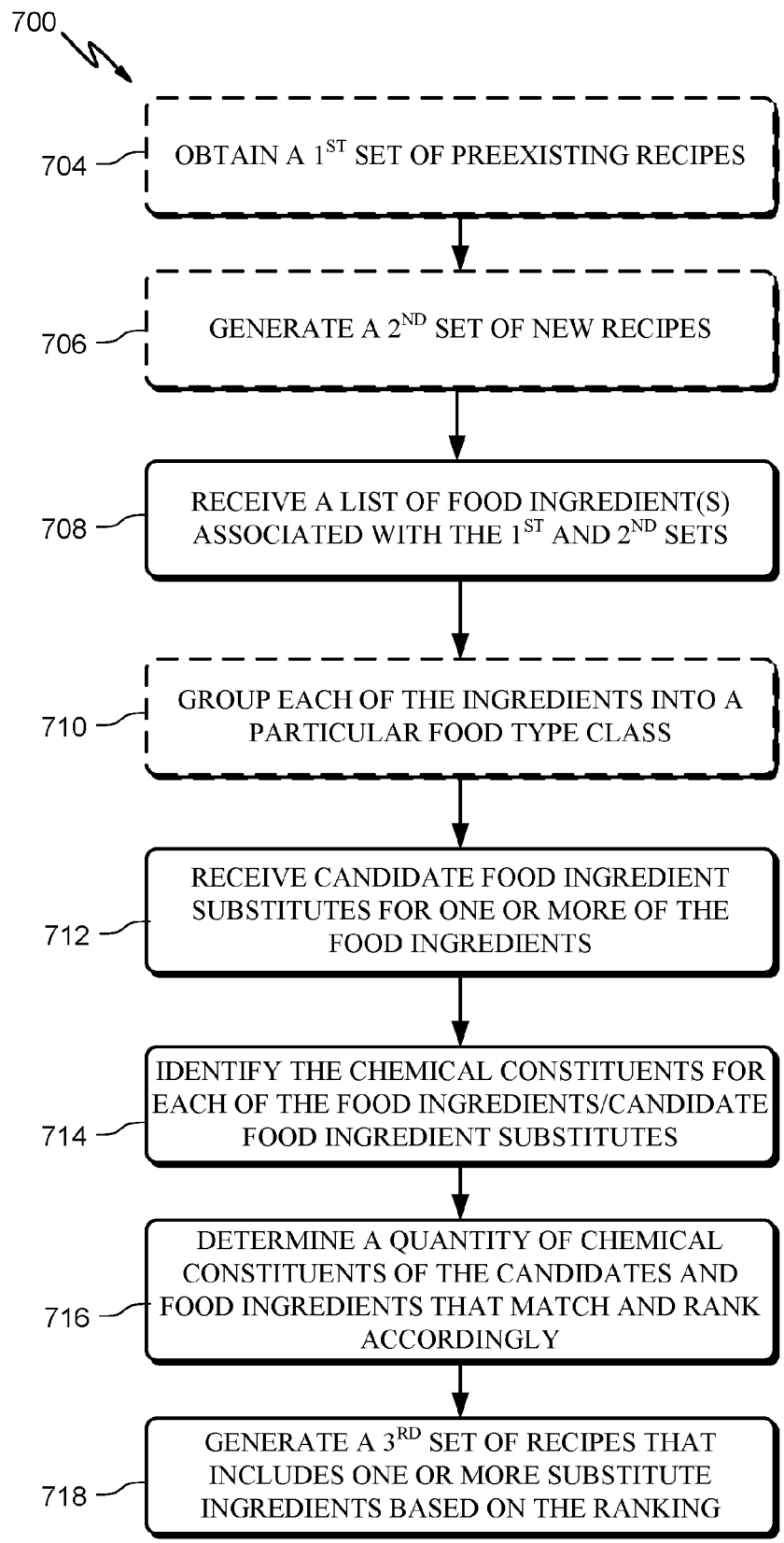
FIG. 7 is a flow diagram of an example process for generating a recipe based on identifying one or more food ingredient substitutes for a particular recipe, according to embodiments.

FIG. 7 is a flow diagram of an example process 700 for generating a recipe based on identifying one or more substitute food ingredients for a particular recipe. The process 700 may begin at block 704 when a NLP system obtains a first set of known or preexisting recipes. These known or preexisting recipes may be recipes that are ingested (e.g., via the ingestion module 316 of FIG. 3) by an NLP system and stored to an information corpus (e.g., information corpus 226 of FIG. 2). The preexisting recipes may be recipes that are derived from known cookbooks, web pages, social media, etc.

Per block 706, the NLP system may generate (e.g., via the result generator 228 of FIG. 2) a second set of recipes based on a content (e.g., ingredients and preparation steps) of the first set of preexisting recipes. For example, the NLP system may engage in machine learning by identifying patterns and associations (e.g., via the analyzer 214 of FIG. 2) of particular ingredients and/or cooking preparation steps in the first set of preexisting recipes and based on the patterns and associations, the NLP system may generate the second set of recipes, which may be new recipes. Machine learning improves a NLP system's understanding by learning patterns in data and adjusting results accordingly. For example, the NLP system may determine that pesto is most often found with combinations of pasta and bread, under the category of Italian food (via the first set of preexisting recipes). The NLP system may also determine that pesto shares chemical compounds with a particular food ingredient, which may fall outside of the Italian food category. Accordingly, the NLP system may generate a recipe that pairs pesto with pasta and bread, but which also includes the particular food ingredient. This combination may be non-intuitive and may therefore not be within any of the first set of preexisting recipes.

Per block 708, the NLP system may obtain/receive a list of food ingredients that are associated with the first and second sets of recipes. For example, as described above, in one embodiment, the NLP system may parse (e.g., via the tokenizer 216 of FIG. 2) each of the preexisting and new recipes into their ingredient components. Per block 710, the NLP system may group (e.g., via the semantic relationship identifier 220 and/or the food type datastore 226B of FIG. 2) each of the ingredients into a particular food type class. For example, lettuce, peas, and broccoli may be grouped into a vegetable class, whereas chicken, beef, and lamb may be grouped into a meat class.

Per block 712, the NLP system may receive a plurality of candidate substitute ingredients for one or more of the food ingredients. In some embodiments, choosing the candidate substitute ingredients may be based on the food type class that the food ingredients are assigned to (block 710). Accordingly, some or all of the other ingredients listed in the same food type class may become candidate substitute food ingredients. In some embodiments, candidate substitute ingredients may be determined based on at least comparing a first chemical composition of the one or more of the food ingredients to a second chemical composition of the one or more other ingredients (e.g., within the same food type class). For example, as illustrated above, the NLP system may utilize a Jaccard index to determine a quantity of shared chemical compounds between two ingredients. The NLP system may also analyze a quantity of a particular chemical compounds shared between two ingredients, analyze a chemical composition of an ingredient based on what the chemical composition would be both before and after cooking, etc.

Per block 716, the NLP system may then determine (e.g., via the ingredient substitution scoring module 140 of FIG. 1) a quantity of chemical constituents of the candidate food ingredient substitutes and the food ingredients that match (e.g., via the Jaccard index of FIG. 6). The NLP system may then identify one or more food ingredient substitutes based on at least the quantity of chemical constituents of the candidate food ingredient substitutes and the food ingredients that match. In some embodiments, the identifying of the one or more food ingredient substitutes may be in response to ranking each of the candidate food ingredients substitutes based on the matching, as described above. For example, a first substitute may share 10 chemical molecules with a food ingredient and a second substitute may share only 2 chemical molecules with the food ingredient. Accordingly, the first substitute may be ranked higher than the second substitute for substitution and become the food ingredient substitute.

Per block 718, the NLP system may then generate (e.g., via the result generator 228 of FIG. 2) a third set of recipes that include one or more substitute ingredients based on the determining in block 716. For example, referring back to FIG. 4, the second set of recipes may correspond to the ingredient list 406 and the third set of recipes may correspond to the new ingredient list 414.

Figure 8:
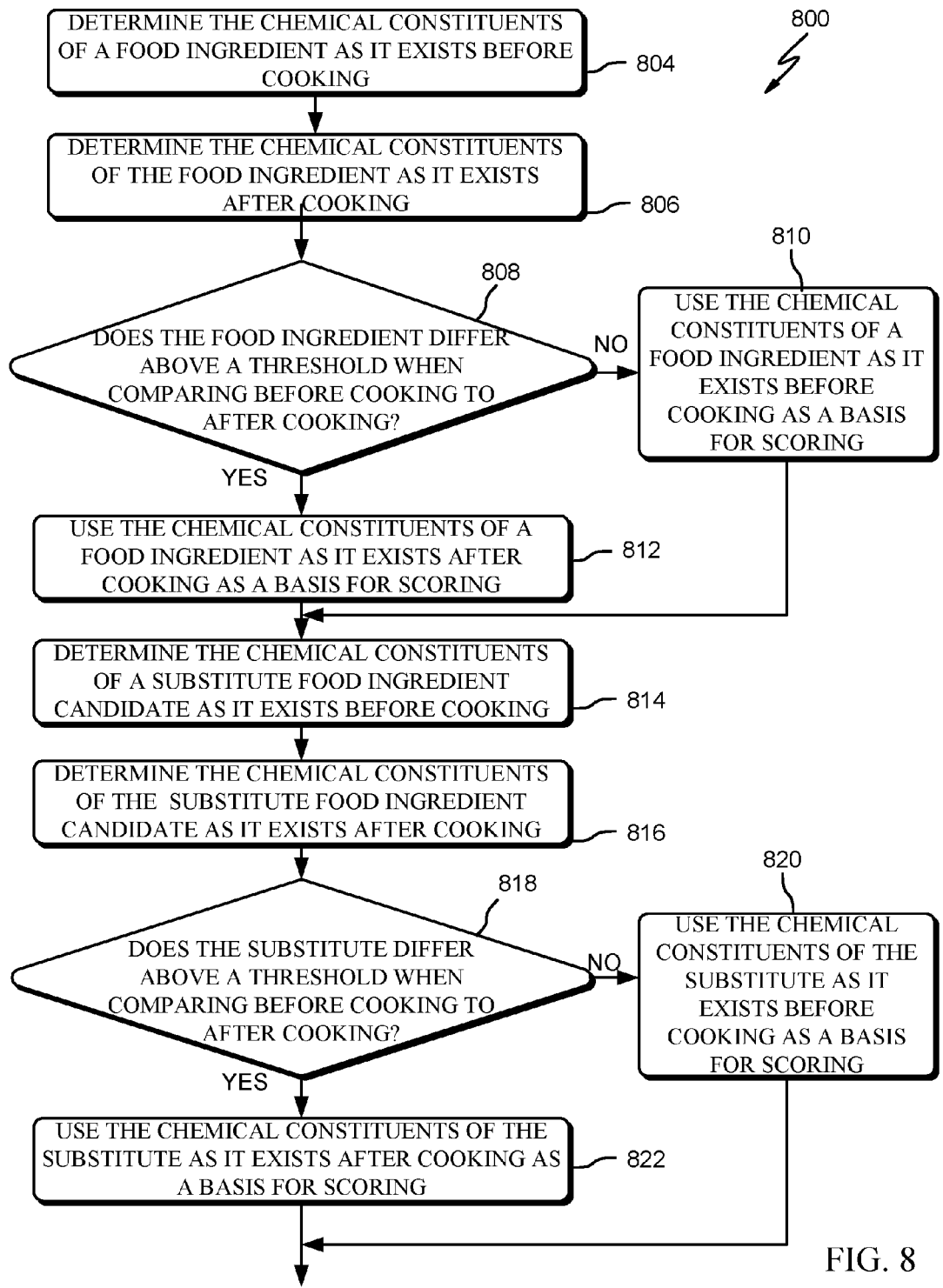
FIG. 8 is an example process for scoring a food ingredient and a substitute food ingredient candidate based on how chemical constituents exist before and after cooking, according to embodiments.

FIG. 8 is an example process 800 for scoring a food ingredient and a candidate food ingredient substitute based on how a chemical composition exists before and after cooking, according to embodiments. The process 800 is based on the principle that applying heat to cook a particular chemical constituent (or set of chemical constituents) may cause that particular chemical constituent to change or become a different chemical constituent altogether. Therefore, for example, a change to a particular molecule or set of molecules because of applied heat may change the taste, aroma, and/or texture of a particular ingredient, which may affect whether a particular food ingredient is a suitable candidate substitute ingredient.

The process 800 may begin at block 804 when the NLP system determines (e.g., via the chemical constituent datastore 226C of FIG. 2) the chemical constituents of a food ingredient (e.g., sour cream) as it exists before cooking. For example, a datastore may specify that before a cooking process, a particular existing ingredient may include 4 particular chemical compounds. Per block 806, the NLP system may determine the chemical constituents of a food ingredient as it exists after cooking. Using the example above, the datastore may specify that after the cooking process, the particular existing ingredient may include 5 particular compounds instead of 4. Per block 808, the NLP system may determine whether the chemical constituents of the food ingredient differs above a threshold when comparing before cooking and after cooking. The threshold may be any suitable quantity or value. For example, if only 1 of 8 chemical compounds change after a cooking process for a particular food ingredient, the particular food ingredient may not have changed above a threshold. Alternatively, if 4 of 8 chemical compounds changed after a cooking process for the particular food ingredient, the particular food ingredient may have changed above a threshold.

Per block 810, if the chemical constituents of the food ingredient does not differ above a threshold, then the NLP system may use the chemical constituents of the food ingredient as it exists before cooking as a basis for scoring. For example, referring back to FIG. 6, the chemical constituents specified for sour cream within the venn diagram 602 may be based on the chemical constituents of sour cream as it exists before cooking. Accordingly, these chemical constituents may be utilized for the Jaccard index score, or any other score and may be assigned as a baseline for comparing food ingredients with candidate food ingredient substitutes.

Per block 812, if the chemical constituents differ above a threshold, then the NLP system may use the chemical constituents of the food ingredient as it exists after cooking as a basis for scoring and may be assigned as a baseline for comparing food ingredients with candidate food ingredient substitutes. Per block 814, the NLP system may then determine the chemical constituents of a substitute food ingredient candidate (e.g., cottage cheese) as it exists before cooking. Per block 816, the NLP system may then determine the chemical constituents of the substitute food ingredient candidate as it exists after cooking. Per block 818, the NLP system may then determine whether the chemical constituents of the substitute ingredient candidate differs above a threshold when comparing before cooking to after cooking.

Per block 820, if the chemical constituents of the substitute food ingredient candidate does not differ above a threshold, then the NLP system may then use the chemical constituents of the substitute food ingredient candidate as it exists before cooking as a basis for scoring and may be assigned as a baseline for comparing food ingredients with candidate food ingredient substitutes. For example, referring back to FIG. 6, the chemical constituents of yogurt within venn diagram 602 may be the chemical constituents of a substitute food ingredient candidate as it exists before cooking. Accordingly, the yogurt chemical constituents may be utilized for the Jaccard index score. Per block 822, if the chemical constituents of the substitute food ingredient candidate differs above a threshold, then the NLP system may use the chemical constituents of the substitute food ingredient candidate as it exists after cooking as a basis for scoring and may be assigned as a baseline for comparing food ingredients with candidate food ingredient substitutes. In some embodiments, data processing systems other than a NLP system may perform any of the processes, blocks, or operations as described herein (e.g., process 700, process 800, etc.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for identifying substitutes for ingredients in a recipe based on analyzing chemical association, the system comprising:
   a computing device having a processor; and
   a computer readable storage medium having program instructions embodied therewith, the program instructions executable by the processor to cause the system to:
      obtain, by a natural language processing (NLP) computing system, a first set of preexisting recipes;
      generate, by the NLP computing system and in response to the receiving of the preexisting recipes, a second set of new recipes based on at least a machine learning associated with the first set of preexisting recipes;
      receive, by the NLP computing system, a first food ingredient in response to the generating of the second set of new recipes, the first food ingredient comprising a first plurality of chemical constituents;
      receive, by the NLP computing system, a plurality of candidate food ingredient substitutes, each candidate food ingredient substitute comprising a second plurality of chemical constituents;
      determine, by the NLP computing system and for each of the plurality of candidate food ingredient substitutes, a quantity of the second plurality of chemical constituents that match the first plurality of chemical constituents, the match being based on a chemical structure similarity between the second plurality of chemical constituents and the first plurality of chemical constituents; and
      identify, by the NLP computing system, one or more food ingredient substitutes based on at least the quantity of the second plurality of chemical constituents that match the first plurality of chemical constituents.

2. The system of claim 1, wherein the program instructions executable by the processor further cause the system to:
   rank each of the plurality of candidate food ingredient substitutes based on the determining; and
   generate, in response to the ranking, a first set of recipes, wherein each recipe of the first set includes the one or more food ingredient substitutes.

3. The system of claim 1, wherein the plurality of candidate food ingredient substitutes includes a second food ingredient and a third food ingredient, and wherein the program instructions executable by the processor to cause the system to determine includes:
   determining that the second food ingredient shares a higher quantity of chemical molecules with the first food ingredient than the third food ingredient shares with the first food ingredient; and
   ranking the second food ingredient as a higher candidate for substitution than the third food ingredient, wherein the one or more food ingredient substitutes includes the second food ingredient but not the third food ingredient.

4. The system of claim 1, wherein the program instructions executable by the processor further cause the system to group the first food ingredient into a particular food type class, wherein the receiving of the plurality of candidate food ingredient substitutes is based on the particular food type class that the first food ingredient is in.

5. The system of claim 1, wherein the program instructions executable by the processor to cause the system to identify one or more food ingredient substitutes includes:
   ranking each of the plurality of candidate food ingredient substitutes based on at least comparing a first texture description of each of the plurality of candidate food ingredient substitutes with a second texture description of the first food ingredient; and
   generating, in response to at least the ranking, a first set of recipes that includes the one or more food ingredient substitutes.

6. The system of claim 1, wherein the program instructions executable by the processor further cause the system to:
   determine a third plurality of chemical constituents of the first food ingredient as it exists before the first food ingredient is cooked;
   determine a fourth plurality of chemical constituents of the first food ingredient as it exists after the first food ingredient is cooked;
   compare the third plurality of chemical constituents with the fourth plurality of chemical constituents;
   determine, based on the comparing, that the fourth plurality of chemical constituents differs from the third plurality of chemical constituents above a threshold; and
   assign the fourth plurality of chemical constituents to be the first plurality of chemical constituents.

7. A computer program product for identifying substitutes for ingredients in a recipe based on analyzing chemical association, the computer program product comprising a computer readable storage medium having program code embodied therewith, the program code comprising computer readable program code, the computer readable program code being configured for:
   receiving, by a natural language processing (NLP) computing system, a first food ingredient, the first food ingredient comprising a first plurality of chemical constituents;
   receiving, by the NLP computing system, a plurality of candidate food ingredient substitutes, each candidate food ingredient substitute comprising a second plurality of chemical constituents;
   determining, by the NLP computing system and for each of the plurality of candidate food ingredient substitutes, a quantity of the second plurality of chemical constituents that match the first plurality of chemical constituents, the match being based on at least measuring an amount structural overlap between the second plurality of chemical constituents and the first plurality of chemical constituents; and
   identifying, by the NLP computing system, one or more food ingredient substitutes based on at least the quantity of the second plurality of chemical constituents that match the first plurality of chemical constituents.

8. The computer program product of claim 7, wherein the computer readable program code is further configured for:
   obtaining, prior to the receiving of the first food ingredient, a first set of preexisting recipes; and
   generating, by the natural language processing (NLP) module and prior to the receiving of the first food ingredient, a second set of new recipes based on at least a content of the first set of preexisting recipes, wherein the receiving of the first food ingredient is in response to the obtaining and generating, wherein the NLP module includes at least a tokenizer and a syntactic relationship identifier.

9. The computer program product of claim 7, wherein the computer readable program code is further configured for:
- ranking each of the plurality of candidate food ingredient substitutes based on the determining; and
- generating, in response to the ranking, a first set of recipes, wherein each recipe of the first set includes the one or more food ingredient substitutes.

10. The computer program product of claim 7, wherein the plurality of candidate food ingredient substitutes includes a second food ingredient and a third food ingredient, and wherein the determining includes:
- determining, via a jaccard index, that the second food ingredient shares a higher quantity of chemical molecules with the first food ingredient than the third food ingredient shares with the first food ingredient; and
- ranking, based on a result of the jaccard index, the second food ingredient as a higher candidate for substitution than the third food ingredient, wherein the one or more food ingredient substitutes includes the second food ingredient but not the third food ingredient.

11. The computer program product of claim 7, wherein the computer readable program code is further configured for grouping the first food ingredient into a particular food type class, wherein the receiving of the plurality of candidate food ingredient substitutes is based on the particular food type class that the first food ingredient is in.

12. The computer program product of claim 7, wherein the computer readable program code is further configured:
- ranking each of the plurality of candidate food ingredient substitutes based on at least comparing a first flavor description of each of the plurality of candidate food ingredient substitutes with a second flavor description of the first food ingredient; and
- generating, in response to at least the ranking, a first set of recipes that includes the one or more food ingredient substitutes.

13. A method for identifying substitutes for ingredients in a recipe based on analyzing chemical association, the method comprising:
- receiving, by a natural language processing (NLP) computing system, a user input of data, the data describing a first set of food ingredients;
- generating, by the NLP computing system and in response to the user input, at least a first recipe that includes the first set of food ingredients;
- grouping, by the NLP computing system, one or more ingredients of the first recipe into food type classes;
- identifying, by the NLP computing system, one or more chemical constituents for the one or more ingredients; and
- identifying, by the NLP computing system, one or more food ingredient substitutes for the one or more ingredients by at least:
  - locating a list of food ingredients within a same food type class as the one or more ingredients, and
  - determining which food ingredient of the list of food ingredients has a highest quantity of chemical constituents that match the chemical constituents of the one or more ingredients, wherein the matching is based on a chemical structure similarity.

* * * * *